United States Patent
Miyata et al.

(10) Patent No.: US 9,778,098 B2
(45) Date of Patent: Oct. 3, 2017

(54) NATURAL-FREQUENCY MEASUREMENT DEVICE

(71) Applicant: BANDO CHEMICAL INDUSTRIES, LTD., Kobe-shi, Hyogo (JP)

(72) Inventors: Hirofumi Miyata, Hyogo (JP); Yoshikazu Wakizaka, Hyogo (JP); Yasushi Chida, Hyogo (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 254 days.

(21) Appl. No.: 14/715,975

(22) Filed: May 19, 2015

(65) Prior Publication Data

US 2015/0253181 A1 Sep. 10, 2015

Related U.S. Application Data

(63) Continuation of application No. PCT/JP2013/006976, filed on Nov. 27, 2013.

(30) Foreign Application Priority Data

Dec. 10, 2012 (JP) ................................ 2012-269753

(51) Int. Cl.
*G01P 15/00* (2006.01)
*G01L 5/10* (2006.01)
*G01H 13/00* (2006.01)
*G01P 15/125* (2006.01)

(52) U.S. Cl.
CPC ............. *G01H 13/00* (2013.01); *G01L 5/106* (2013.01); *G01P 15/00* (2013.01); *G01P 15/125* (2013.01)

(58) Field of Classification Search
CPC ....... G01H 13/00; G01P 15/00; G01P 15/125; G01L 5/106
USPC ........................................................ 73/579
See application file for complete search history.

(56) References Cited

U.S. PATENT DOCUMENTS

| 5,435,191 A | 7/1995 | Kawachi |
| 5,698,796 A | 12/1997 | Hirano |
| 5,877,431 A * | 3/1999 | Hirano ............. G01L 5/042 73/862.41 |
| 7,185,546 B2 * | 3/2007 | Le ................... G01L 5/042 73/801 |

(Continued)

FOREIGN PATENT DOCUMENTS

| CN | 102252792 A | 11/2011 |
| JP | 62112018 A * | 5/1987 |

(Continued)

OTHER PUBLICATIONS

International Search Report for corresponding International Application No. PCT/JP2013/006976 dated Dec. 24, 2013.

(Continued)

*Primary Examiner* — J M Saint Surin
(74) *Attorney, Agent, or Firm* — Renner Otto Boisselle & Sklar, LLP (57) ABSTRACT

A natural-frequency measurement device for measuring the natural frequency of a belt includes: an acceleration sensor attached to a portion of the belt between an adjacent pair of pulleys to sense acceleration resulting from the vibration of the belt; and a measuring instrument configured to measure the natural frequency of the belt based on the acceleration sensed by the acceleration sensor.

4 Claims, 5 Drawing Sheets

(56) References Cited

U.S. PATENT DOCUMENTS

| | | | |
|---|---|---|---|
| 8,328,005 B2 * | 12/2012 | King | B65G 23/44 198/810.04 |
| 9,182,300 B2 * | 11/2015 | Themm | G01L 1/103 |
| 2011/0288792 A1 | 11/2011 | Ohmori et al. | |
| 2013/0008253 A1 | 1/2013 | Tsuda | |

FOREIGN PATENT DOCUMENTS

| | | | |
|---|---|---|---|
| JP | S62-261937 | | 11/1987 |
| JP | H06-137932 | | 5/1994 |
| JP | 07055610 | * | 3/1995 |
| JP | H08-327477 | | 12/1996 |
| JP | H09-211340 | | 8/1997 |
| JP | 2001-264151 A | | 9/2001 |
| JP | 2004-177190 | | 6/2004 |
| JP | 2005-257350 | | 9/2005 |
| JP | 2001-196744 A | | 10/2011 |
| JP | 2012237174 A | * | 12/2012 |
| WO | WO 2010/087266 A1 | | 8/2010 |

OTHER PUBLICATIONS

Form PCT/ISA/237 for corresponding International Application No. PCT/JP2013/006976 dated Dec. 24, 2013.

* cited by examiner

NATURAL-FREQUENCY MEASUREMENT DEVICE

CROSS-REFERENCE TO RELATED APPLICATIONS

This is a continuation of International Application No. PCT/JP2013/006976 filed on Nov. 27, 2013, which claims priority to Japanese Patent Application No. 2012-269753 filed on Dec. 10, 2012. The entire disclosures of these applications are incorporated by reference herein.

BACKGROUND

The present invention relates to a natural-frequency measurement device for measuring the natural frequency of a belt, and more particularly relates to a technique for improving the accuracy with which the natural frequency is measured.

Unless a belt which is used in a belt transmission system so as to be stretched between its pulleys were placed under appropriate tension during its operation, the belt would either transmit the rotational forces of the pulleys less efficiently or shorten its life by itself. To address this problem, a tension test has been conducted in this field to measure the tension of a belt for use in a belt transmission system and examine whether the belt is placed under appropriate tension.

In carrying out a tension test on a belt, a sonic belt tension measurement device is often used, because the device enables the tester to measure its tension by a simple and non-contact method.

A sonic belt tension measurement device includes a natural-frequency measurement device. The natural-frequency measurement device senses, through a microphone, the sound waves produced by a belt stretched between pulleys when the belt is excited, and measures the natural frequency of the belt based on the sound waves sensed through the microphone. The sonic belt tension measurement device is configured to calculate the belt tension, corresponding to the natural frequency measured by the natural-frequency measurement device, according to a predetermined formula (see, for example, Japanese Unexamined Patent Publication No. H06-137932).

SUMMARY

Unfortunately, such a natural-frequency measurement device that uses a microphone senses sound waves with background noise, which tends to interfere with, and decrease, the accuracy of the natural frequency measured. Such background noise tends to be produced, in particular, in a radio frequency range. Thus, if the belt vibration is a high-frequency vibration, the resultant measurement accuracy will be low. On the other hand, if the belt vibration is a low-frequency vibration, such a vibration is often too difficult to transform into sound waves to be sensible for its microphone.

For these reasons, such a natural-frequency measurement device with a microphone can barely measure the frequency of the vibration effectively and reliably enough within only a narrow range. If the vibration of a belt under measurement is a high- or low-frequency vibration, such a device does not ensure sufficiently high measurement accuracy.

It is therefore an object of the present invention to accurately measure the natural frequency of a belt over a wide frequency range.

To achieve this object, according to this invention, an acceleration sensor is used as an element for sensing the vibration of a belt.

Specifically, the present invention is directed to a natural-frequency measurement device for measuring the natural frequency of a belt based on the vibration set up by exciting the belt stretched between at least two pulleys, and provides the following solutions.

More specifically, a first aspect of the invention provides a natural-frequency measurement device including: an acceleration sensor attached to a portion of a belt between two adjacent ones of at least two pulleys to sense acceleration resulting from the vibration of the belt; and a measuring instrument configured to measure the natural frequency of the belt based on the acceleration sensed by the acceleration sensor.

According to the first aspect of the invention, the natural frequency of the belt is measured based on the acceleration sensed by the acceleration sensor attached directly to the belt. This allows the acceleration sensor to sense the vibration of the belt directly. Such direct sensing prevents an external environmental factor such as background noise from affecting the measurement results as is often the case with a non-contact type natural-frequency measurement device including a microphone, and enables accurate sensing of low-frequency vibration. Thus, the natural frequency of the belt can be measured accurately, no matter whether the vibration of the belt under measurement is a high-frequency one or a low-frequency one. Consequently, the natural frequency of the belt can be measured accurately over a wide frequency range.

According to a second aspect of the invention which is an embodiment of the natural-frequency measurement device according to the first aspect of the invention, the measuring instrument may measure the natural frequency of the belt based on the acceleration sensed by the acceleration sensor for a period of time of 80 to 1400 milliseconds since the belt has been vibrated.

The vibration of the belt that has just been excited contains too much noise such as impact components generated by exciting the belt to provide data that is reliable enough to calculate the natural frequency of the belt accurately. The noise components will attenuate with time, which allows the belt to recover its vibration waveform with its natural frequency gradually.

Also, the vibration of the belt will attenuate more and more with time, and when its vibration has attenuated thoroughly, noise components that are not associated with the natural vibration of the belt will be predominant over its weak vibration waveform. In such a situation, the natural vibration of the belt is dominated by the noise components, and cannot provide data that is reliable enough to calculate the natural frequency of the belt accurately.

The present inventors empirically discovered that the vibration of the belt contained a lot of noise components until about 80 milliseconds passed since the belt had been excited, and that the belt vibration turned into the weak and completely attenuated one with a low degree of reliability when about 1400 milliseconds passed since the belt had been excited. According to the second aspect of the invention, the natural frequency of the belt is measured for a period of time that does not include the initial vibration of the belt containing a lot of noise components immediately after the belt has been excited or the terminal vibration of the belt in which the natural vibration of the belt is dominated by the noise components. This enables more accurate measurement of the natural frequency of the belt.

According to a third aspect of the invention which is an embodiment of the natural-frequency measurement device of the first or second aspect of the invention, the measuring instrument may determine the natural frequency of the belt in a frequency range of greater than or equal to 10 Hz.

The noise components that are not associated with the natural vibration of the belt tend to be sensed in a low frequency range of less than 10 Hz. According to the third aspect of the invention, the natural frequency of the belt is determined except in a frequency range of less than 10 Hz in which such noise components tend to be sensed. This enables more accurate measurement of the natural frequency of the belt.

According to a fourth aspect of the invention which is an embodiment of the natural-frequency measurement device of any one of the first through third aspects of the invention, when an acceleration of greater than a gravitational acceleration of 2.0 is sensed by the acceleration sensor, the measuring instrument may sense that the belt has been excited.

Suppose the belt is sensed to have been excited when an acceleration of less than a gravitational acceleration of 2.0 is sensed by the acceleration sensor. In that case, even if a subtle vibration was set up by the belt as a result of a measuring operation or depending on a measuring environment before the belt is excited, the belt vibration would be easily sensed erroneously, and would trigger an unintentional start of measurement of the natural frequency. In that case, the measurement of the natural frequency would not start at an intended timing. This would cause a measurement error, or should cause a significant decrease in the accuracy of the natural frequency measured, even if it could be measured successfully.

To overcome this problem, according to the fourth aspect of the invention, when an acceleration of greater than a gravitational acceleration of 2.0 is sensed by the acceleration sensor, the belt is sensed to have been excited. This can prevent such a subtle vibration to be set up by the belt as a result of a measuring operation or depending on a measuring environment before the belt is excited from triggering an unintentional start of measurement of the natural frequency, and enables a start of measurement of the belt's natural frequency at an intended timing. As a result, measurement errors can be reduced, and the natural frequency of the belt can be measured accurately.

According to a fifth aspect of the invention which is an embodiment of the natural-frequency measurement device of any one of the first through fourth aspects of the invention, the acceleration sensor and the measuring instrument may be connected together via a communication cable, and the communication cable may include scales along its length.

In the fifth aspect of the invention, the communication cable through which the acceleration sensor and the measuring instrument are connected together includes scales along its length. Thus, the communication cable can be used as a measure. To determine the tension of a belt based on the natural frequency of the belt, the span length of a portion of the belt stretched between pulleys needs to be collected as a piece of information. The present invention enables measurement of the span length of such a portion of the belt stretched between two pulleys using the communication cable without preparing a measure separately from the natural-frequency measurement device, and can reduce the number of tools that need to be provided to measure the tension of the belt.

According to the present invention, the natural frequency of a belt is measured based on the acceleration sensed by an acceleration sensor attached directly to the belt, thereby allowing the acceleration sensor to sense the vibration of the belt directly. This enables accurate measurement of the natural frequency of the belt over a wide frequency range.

DETAILED DESCRIPTION

Embodiments of the present invention will now be described with reference to the drawings. Note that the following description of embodiments is merely illustrative in nature, and is not intended to limit the scope, applications, or use of the invention.

<First Embodiment of the Invention>

Figure 1:
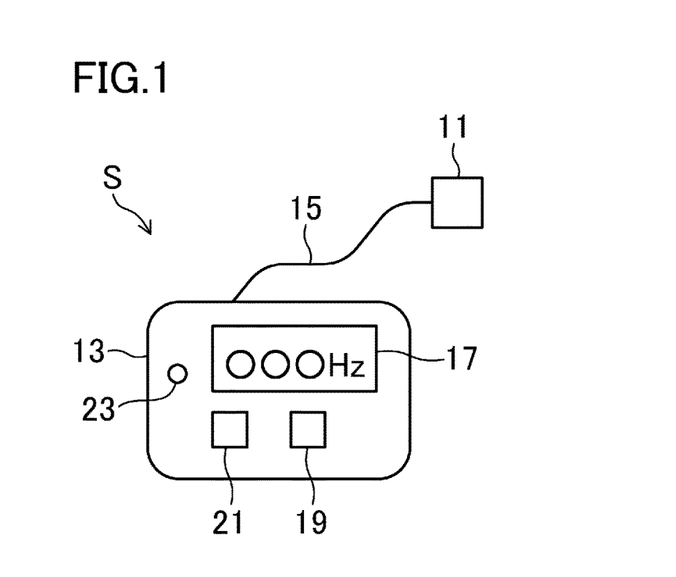
FIG. 1 is a plan view illustrating the appearance of a natural-frequency measurement device according to a first embodiment of the present invention.
Figure 2:
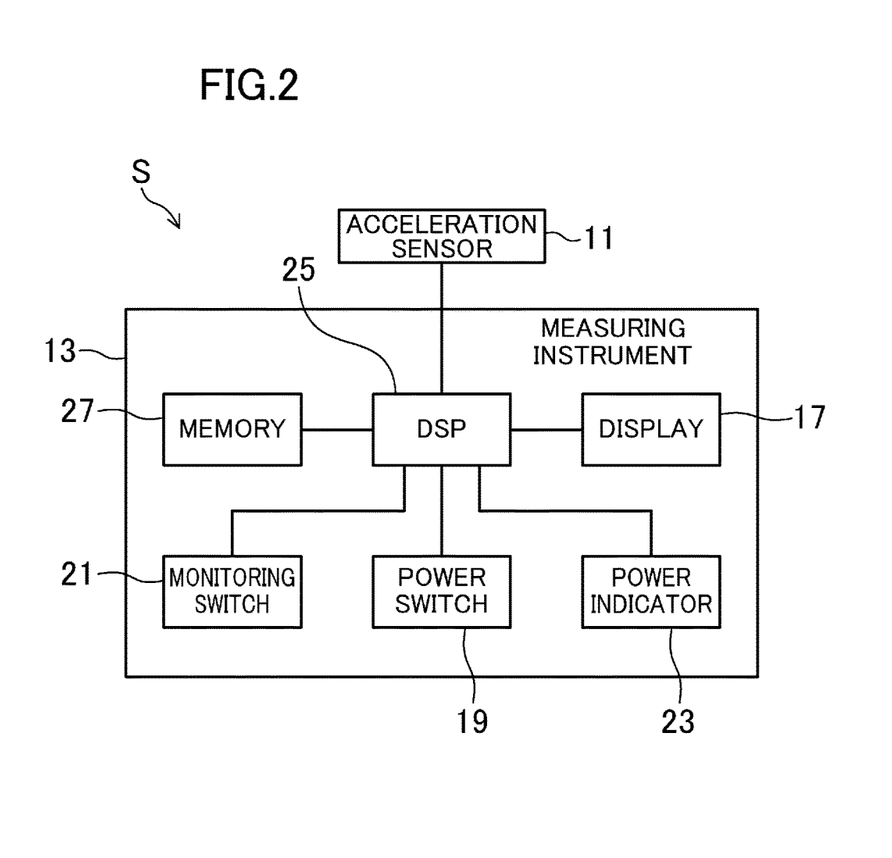
FIG. 2 is a block diagram illustrating generally a hardware configuration for a natural-frequency measurement device according to the first embodiment of the present invention.
Figure 3:
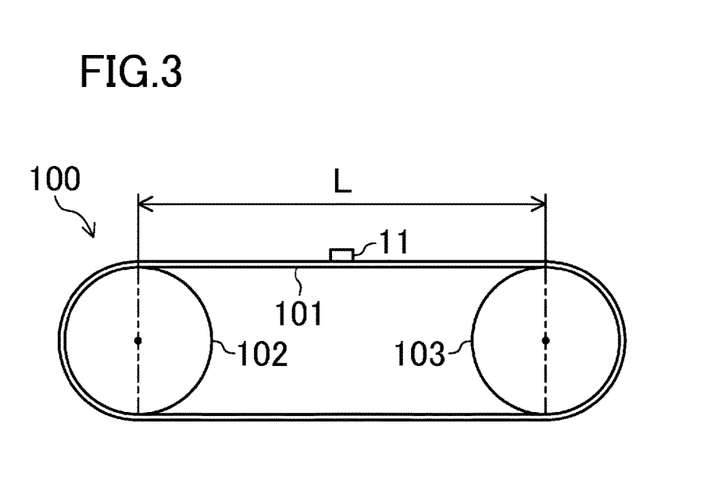
FIG. 3 illustrates an example of a belt transmission system including a belt under measurement.

FIG. 1 is a plan view illustrating the appearance of a natural-frequency measurement device S according to a first embodiment of the present invention. FIG. 2 is a block diagram illustrating generally a hardware configuration for the natural-frequency measurement device S according to the first embodiment of the present invention. FIG. 3 illustrates a belt transmission system 100 including a belt 101 under measurement.

The natural-frequency measurement device S according to the first embodiment is used, for example, to measure the natural frequency of the belt 101 that the belt transmission system 100 illustrated in FIG. 3 may have. This belt transmission system 100 is used, for example, to drive automotive accessories. The natural frequency of the belt 101 measured by the natural-frequency measurement device S is utilized as information for determining the tension of the belt 101 of the belt transmission system 100.

—Configuration of Natural-Frequency Measurement Device S—

In the belt transmission system 100, the belt 101 is stretched between at least two (e.g., two in the example shown in FIG. 3) adjacent pulleys 102 and 103 illustrated in FIG. 3. The natural-frequency measurement device S measures the natural frequency of the belt 101 based on a vibration set up by exciting, with a hammer or a finger, a portion of the belt 101 stretched therebetween.

The belt 101 under measurement is a thick belt, such as a V belt (a wrapped V-belt or a raw edge V-belt) having a thickness of 10 mm or more. If such a thick belt 101 is loosely wound around the pulleys 102 and 103 under relatively low tension, the belt 101 will set up a low-frequency vibration. In particular, a low-frequency vibration with a frequency of 25 Hz or less is often insensible for a microphone, and is difficult to accurately measure with a sonic natural-frequency measurement device.

As illustrated in FIG. 1, the natural-frequency measurement device S includes an acceleration sensor 11 configured to sense acceleration resulting from the vibration of the belt 101, and a measuring instrument 13 configured to measure the natural frequency of the belt 101 based on the acceleration sensed by the acceleration sensor 11. The acceleration sensor 11 and the measuring instrument 13 are connected together via a communication cable 15 (such as a universal serial bus (USB)).

The acceleration sensor 11 is attached to an outer (upper) peripheral surface of a portion of the belt 101 stretched between the adjacent pulleys 102 and 103 in the belt transmission system 100 as illustrated in FIG. 3. A surface of the acceleration sensor 11 to be attached to the belt 101 is a repeatedly attachable adhesive surface made of, for example, a double-sided adhesive tape. Thus, the acceleration sensor 11 can be easily attached to the belt 101 by simply pressing the adhesive surface onto the surface of the belt 101.

This acceleration sensor 11 can sense the acceleration perpendicularly to the surface of the belt 101, and may be a three-axis acceleration sensor, for example. A capacitive-sensing micro-electromechanical system (MEMS) acceleration sensor is preferably used as the acceleration sensor 11, because such a sensor can sense the acceleration with good stability.

The capacitive-sensing MEMS acceleration sensor 11 includes a sensing element section that senses the acceleration, and a signal processing circuit that amplifies and adjusts a signal from the sensing element section to output the amplified and adjusted signal. The sensing element section is made of a stable substance such as silicon (Si), includes a sensor movable portion and a stationary portion, and senses the acceleration based on a variation in capacitance between the sensor movable portion and the stationary portion.

The acceleration sensor 11 does not have to be the capacitive-sensing MEMS acceleration sensor described above but may also be any other type of an acceleration sensor which uses any other sensing method, such as a piezoresistive MEMS acceleration sensor. The acceleration sensor 11 may also be any uniaxial or biaxial acceleration sensor as long as the sensor can sense the acceleration perpendicularly to the surface of the belt 101.

The measuring instrument 13 is a palmtop and flat one, and is readily portable because of its small size. An upper end of the measuring instrument 13 has a USB port (not shown), to which a USB connector (not shown) provided at one end of the communication cable 15 is connected. On the front surface of the measuring instrument 13, arranged are a display 17, various switches such as a power switch 19 and a monitoring switch 21, and a status indicator lamp such as a power indicator 23. The display 17 may be a liquid crystal display to display the natural frequency of the belt 101 which has been measured. The power supply indicator 23 may be a light-emitting diode (LED) indicating whether the power supply is ON or OFF.

As illustrated in FIG. 2, this measuring instrument 13 further includes a digital signal processor (DSP) 25 that is a microprocessor, and a memory 27, such as an electrically erasable programmable read-only memory (EEPROM), which is electrically connected to the DSP 25.

The memory 27 stores a program for measuring the natural frequency of the belt 101. The program includes a fast Fourier transform (FFT) computation program. The DSP 25 is electrically connected not only to the memory 27 but also to the display 17, the various switches such as the power switch 19 and the monitoring switch 21, and the status indicator lamp such as the power indicator 23.

The DSP 25 is configured to perform the processing of measuring the natural frequency of the belt 101 in response to, for example, a signal supplied from the monitoring switch 21 and an acceleration signal supplied from the acceleration sensor 11 in accordance with the program read from the memory 27.

Figure 4:
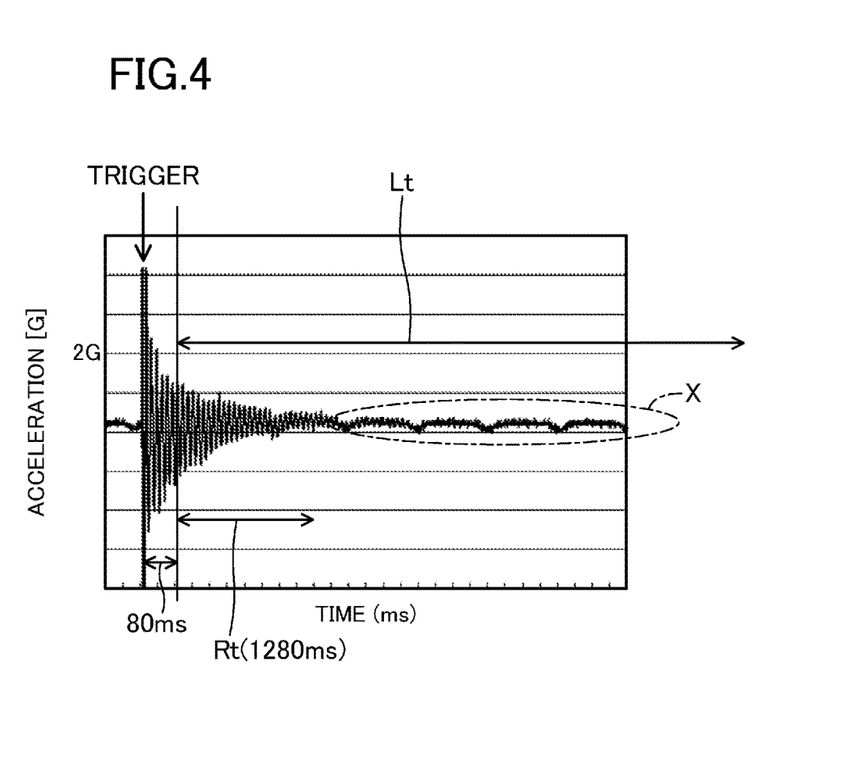
FIG. 4 is a graph illustrating raw data of acceleration resulting from a belt's vibration measured with a natural-frequency measurement device according to the first embodiment of the present invention.
Figure 5:
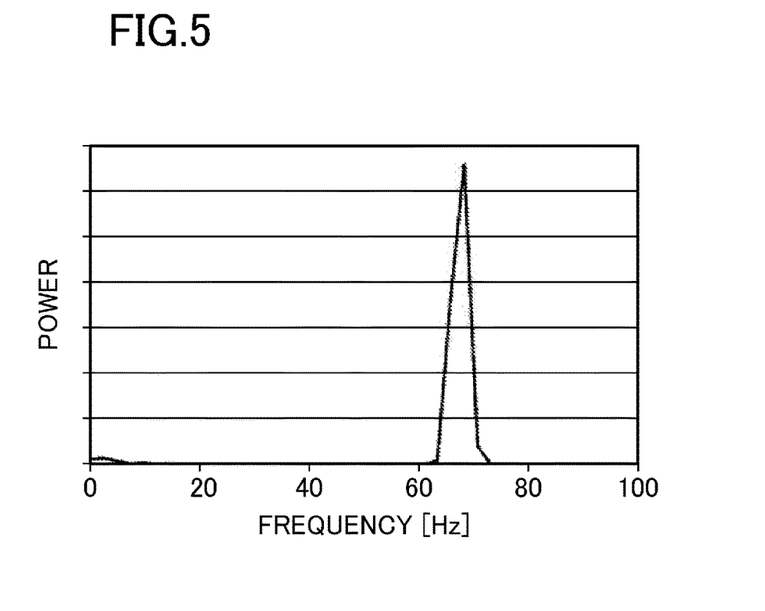
FIG. 5 is a graph illustrating acceleration data collected as samples with a natural-frequency measurement device according to the first embodiment of the present invention and transformed into a power spectrum.
Figure 8:
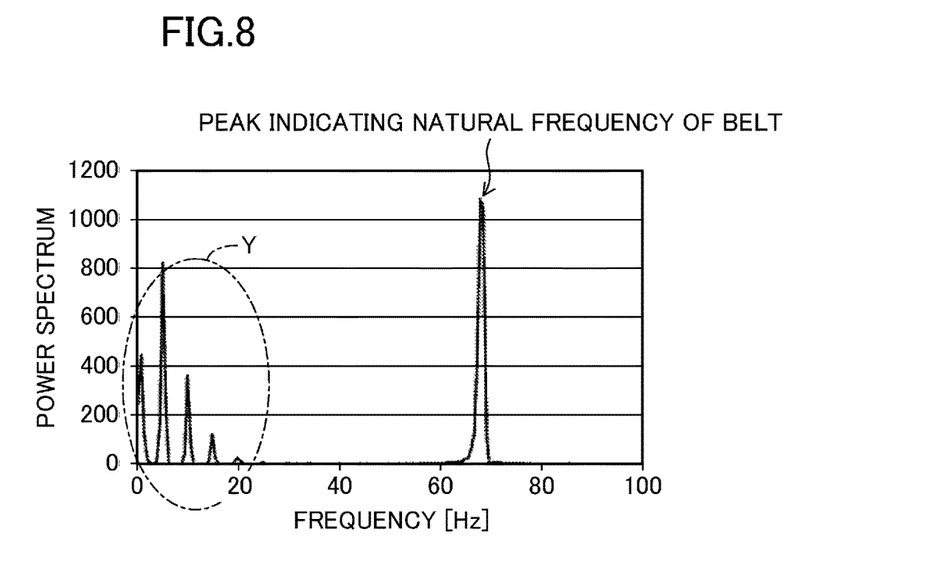
FIG. 8 is a graph illustrating acceleration data transformed into a power spectrum in a situation where an acceleration signal was sampled over a relatively long period of time including a period of time in which the belt's vibration attenuated thoroughly.

FIG. 4 is a graph illustrating raw data of the acceleration resulting from the vibration of the belt 101 measured with the natural-frequency measurement device S. FIG. 5 is a graph illustrating acceleration data collected as samples with the natural-frequency measurement device S and transformed into a power spectrum. FIG. 8 is a graph illustrating acceleration data transformed into a power spectrum in a situation where an acceleration signal was sampled over a relatively long period of time including a time period in which the belt's vibration attenuated thoroughly.

When the power switch 19 is pressed, the DSP 25 activates the measuring instrument 13, and lights the power indicator 23. Then, when the monitoring switch 21 is pressed, the DSP 25 monitors the acceleration signal supplied from the acceleration sensor 11, and starts monitoring the vibration state of the belt 101 illustrated in FIG. 4.

Thereafter, when acceleration greater than a predetermined degree of acceleration is sensed based on the acceleration signal supplied from the acceleration sensor 11, the DSP 25 senses that the belt 101 has been excited, and then starts measuring the natural frequency of the belt 101.

To prevent a subtle vibration to be set up by the belt 101 as a result of a measuring operation or depending on a measuring environment before the belt 101 is excited from triggering an unintentional start of measurement of the natural frequency, the predetermined degree of acceleration triggering a start of measurement of the natural frequency is preferably higher than or equal to 2.0 G (where G represents the gravitational acceleration), and is more preferably higher than or equal to 3.0 G. In this embodiment, the predetermined degree of acceleration acting as such a trigger is set to be 3.0 G.

On sensing that the belt 101 has been excited, the DSP 25 samples the acceleration signal from the acceleration sensor 11 to start collecting acceleration data. At this time, the sampling frequency is set to be, for example, about 3.2 kHz.

The DSP 25 starts recording the acceleration data thus obtained by sampling in 80 milliseconds after having sensed that the belt 101 has been excited, i.e., after having waited for a period of time that it takes to obtain 256 points of acceleration data by sampling. Then, the DSP 25 records the acceleration data obtained by sampling the data over a period of time Rt of 1280 milliseconds since this recording was started, i.e., over a period of time of 1360 milliseconds since the belt 101 was sensed to be excited, and collects a total of 4096 points of acceleration data.

The vibration of the belt 101 that has just been excited contains a lot of noise components such as impact components generated by exciting the belt 101, and does not provide data which is reliable enough to calculate the natural frequency of the belt 101. The noise components will attenuate with time, which allows the belt 101 to recover its vibration waveform with its natural frequency gradually.

The present inventors empirically discovered that the vibration of the belt 101 contained a lot of noise components until about 80 milliseconds passed since the belt 101 had been excited. Thus, in this embodiment, the natural frequency of the belt 101 is not measured until the initial vibration period of the belt 101, which lasts 80 milliseconds since the belt 101 has been excited as described above.

Also, the vibration of the belt 101 will attenuate more and more with time, and when its vibration has attenuated thoroughly, noise components that are not associated with the natural vibration of the belt 101 will be predominant over its weak vibration waveform (shown in the range X in FIG. 4). In such a situation, the natural vibration of the belt 101 cannot provide data that is reliable enough to calculate the natural frequency of the belt 101 accurately.

If an acceleration signal is sampled over a relatively long period of time Lt including the time period in which the belt vibration has attenuated thoroughly, the power spectrum of the vibration frequency based on the acceleration data obtained by sampling tends to have, as will be described later, different peaks (shown in the range Y in FIG. 8) from the natural vibration frequency of the belt 101 as illustrated in FIG. 8.

The present inventors empirically discovered that the belt vibration turned into that weak and completely attenuated one with a low degree of reliability when about 1400 milliseconds passed since the belt had been excited. Thus, in this embodiment, sampling the acceleration signal is stopped when 1280 milliseconds pass since the belt 101 has been sensed to be excited as described above, and the natural frequency of the belt 101 is measured except during the terminal vibration period in which the natural vibration is dominated by the noise components.

The DSP 25 that has obtained the acceleration data as described above retrieves the FFT computation program from the memory 27, subjects the acceleration data (4096 points of data) obtained by sampling to FFT processing, and obtains the power spectrum of such a vibration frequency as illustrated in FIG. 5 based on the acceleration data. Then, the DSP 25 determines the vibration frequency corresponding to a peak of the power spectrum to be the natural frequency of the belt 101.

In this case, even if the power spectrum has its peak at a frequency of less than 10 Hz, the DSP 25 will ignore that peak, and will determine the natural frequency in a frequency range of higher than or equal to 10 Hz. The noise components that are not associated with the natural vibration of the belt 101 tend to be sensed in a low-frequency range of less than 10 Hz. Thus, by determining the natural frequency of the belt 101 with the frequency range of less than 10 Hz removed, the natural frequency of the belt 101 can be measured accurately.

Thereafter, the DSP 25 displays the natural frequency thus determined on the display 17.

—Method for Measuring Natural Frequency—

Next, a method for measuring the natural frequency of the belt 101 using the natural-frequency measurement device S will be described with reference to FIG. 6, which is a flowchart illustrating a method for measuring the natural frequency of the belt 101 according to this embodiment.

Figure 6:
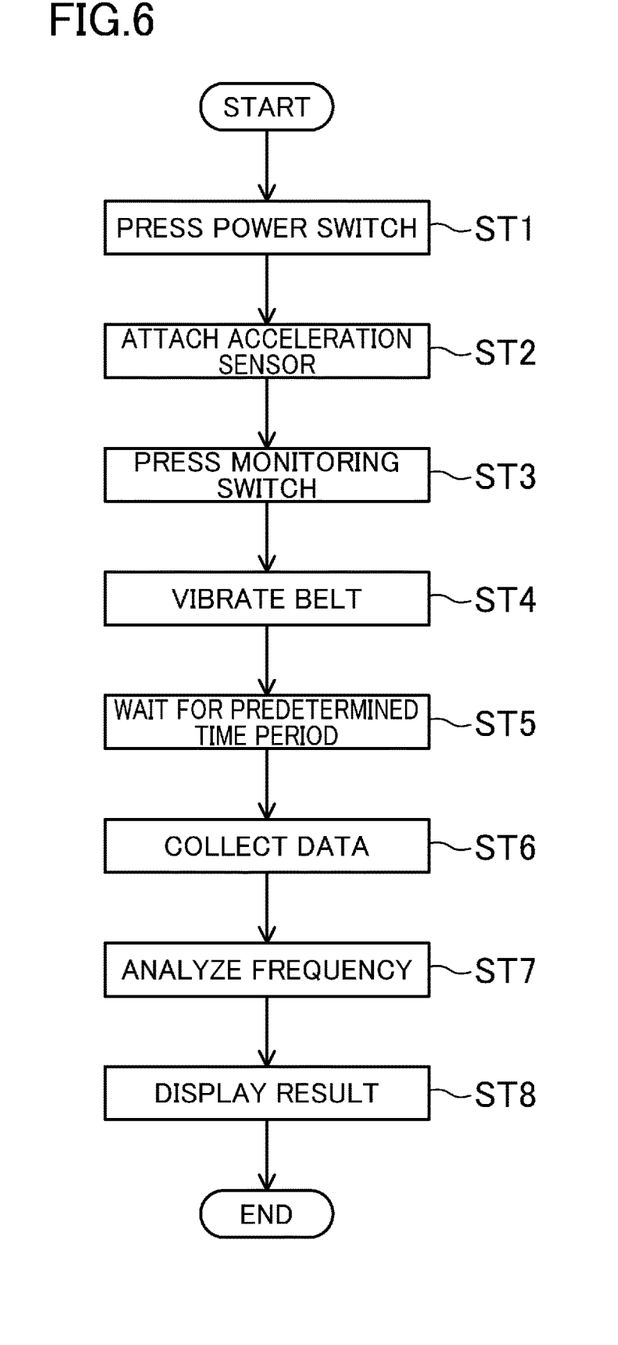
FIG. 6 is a flowchart illustrating a method for measuring the natural frequency of a belt with a natural-frequency measurement device according to the first embodiment of the present invention.

To measure the natural frequency of the belt 101 in the belt transmission system 100, first of all, the power switch 19 is pressed to turn ON the power of the natural-frequency measurement device S as illustrated in FIG. 6 (ST1). Then, as illustrated in FIG. 3, the acceleration sensor 11 is attached to a point on the outer peripheral surface of the belt 101 corresponding to a midpoint between the two pulleys 102 and 103 around which the belt 101 is stretched, or any other point in the vicinity of the former point (ST2).

Next, the monitoring switch 21 is pressed to start monitoring an acceleration signal supplied from the acceleration sensor 11 to the measuring instrument 13 (ST3). Subsequently, the belt 101 is excited, for example, by tapping the belt 101 near its portion with the acceleration sensor 11, i.e., a portion of the belt 101 located midway between the pulleys 102 and 103, with a hammer or by flipping that portion with a finger (ST4).

When such excitation of the belt 101 makes the measuring instrument 13 detect an acceleration signal representing an acceleration of greater than or equal to 3.0 G, the measuring instrument 13 starts sampling the acceleration signal. Then, when the measuring instrument 13 waits for 80 milliseconds since the start of sampling of the acceleration signal (ST5), the measuring instrument 13 starts recording the sampled data. Then, samples of acceleration data are collected over a period of time Rt of 1280 milliseconds since this start of recording (ST6). The acceleration data thus collected then undergoes frequency analysis by FFT processing (ST7), and the natural frequency thus obtained is displayed on the display 17 (ST8).

In this manner, the natural frequency of the belt 101 can be measured in the belt transmission system 100.

—Advantages of First Embodiment—

According to the first embodiment, the natural frequency of the belt 101 is measured based on the acceleration sensed by the acceleration sensor 11 attached directly to the belt 101. This allows the acceleration sensor 11 to sense the vibration of the belt 101 directly. Such direct sensing prevents an external environmental factor such as background noise from affecting the measurement results as is often the case with a sonic natural-frequency measurement device including a microphone, and enables accurate sensing of low-frequency vibration. Thus, the natural frequency of the belt 101 can be measured accurately, no matter whether the vibration of the belt 101 under measurement is a high-frequency one or a low-frequency one. Consequently, the natural frequency of the belt 101 can be accurately measured over a wide frequency range. Therefore, even a thick belt 101 setting up low-frequency vibrations can also have its natural frequency measured accurately.

In addition, according to the first embodiment, the natural frequency of the belt 101 is measured except during the initial vibration period of the belt 101 that has just been excited and the terminal vibration period of the belt 101. The initial vibration contains a lot of noise components that are not associated with the natural vibration. In the terminal vibration period, the natural vibration of the belt 101 is dominated by those noise components. Moreover, the natural frequency of the belt 101 is also determined by excluding a frequency range of less than 10 Hz, i.e., a frequency range in which noise components tend to be sensed. As a result, the natural frequency of the belt 101 can be measured accurately.

<Second Embodiment of the Invention>

Figure 7:
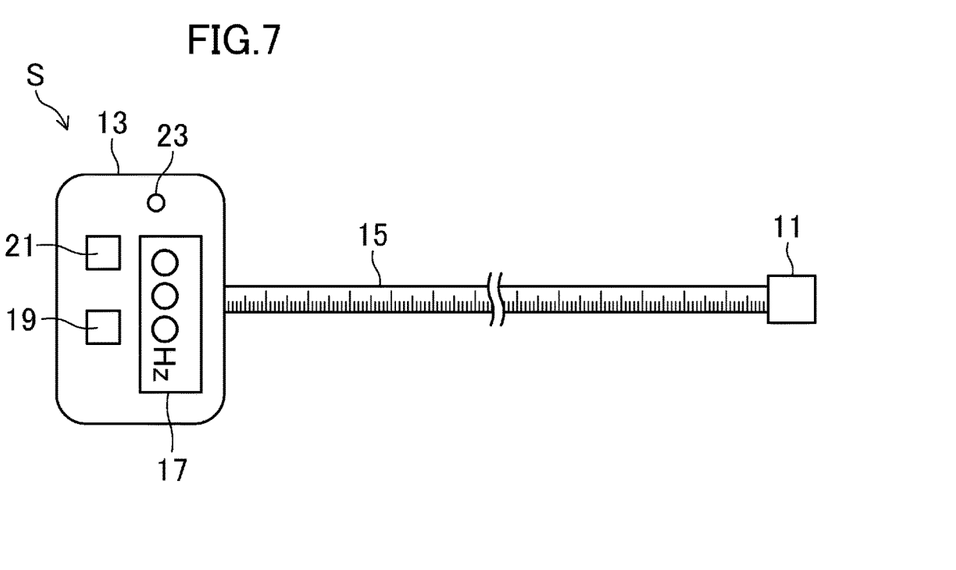
FIG. 7 is a plan view illustrating the appearance of a natural-frequency measurement device according to a second embodiment of the present invention.

FIG. 7 is a plan view illustrating the appearance of a natural-frequency measurement device S according to a second embodiment.

A natural-frequency measurement device S of this embodiment is the same as the first embodiment except that a communication cable 15 of this embodiment has a different configuration from the counterpart of the first embodiment. Thus, the following description of the second embodiment will be focused on only the communication cable 15 having a different configuration. The other elements and method for measuring the natural frequency that have already been described for the first embodiment with reference to FIGS. 1-6 will not be described in detail all over again.

To determine the tension of the belt 101 based on the natural frequency of the belt 101 measured using the natural-frequency measurement device S, the span length L of a portion of the belt 101 stretched between the pulleys 102 and 103 illustrated in FIG. 3 needs to be collected as a piece of information. To satisfy this need, the communication cable 15 of the natural-frequency measurement device S according to this embodiment is provided with scales so as to measure the span length L along its length as illustrated in FIG. 7.

—Advantages of Second Embodiment—

According to the second embodiment, the communication cable 15 through which the acceleration sensor 11 and the measuring instrument 13 are connected together is provided with scales along its length. Thus, the communication cable 15 may be used as a measure. This enables measurement of the span length L of the portion of the belt 101 stretched between the pulleys 102 and 103 with the communication cable 15, even without preparing a measure separately from the natural-frequency measurement device S. As a result, the number of tools to be provided to measure the tension of the belt 101 can be reduced.

In the first embodiment described above, the DSP 25 is supposed to measure the natural frequency of the belt 101 based on the acceleration data obtained by sampling the acceleration signal supplied from the acceleration sensor 11 over a period of time Rt which begins when 80 milliseconds pass since the belt 101 has been excited and which ends when 1360 milliseconds pass since then. However, this is only an example of the present invention. Optionally, the acceleration data for use to measure the natural frequency of the belt 101 may start being sampled even before 80 milliseconds pass since the belt 101 has been excited, or may still be measured even after 1360 milliseconds has passed since the belt 101 has been excited.

Also, for the first embodiment, a thick belt such as a V belt has been mentioned as an exemplary belt 101 under measurement for the natural-frequency measurement device S. However, this is just an example of the present invention. The natural-frequency measurement device S can be naturally used as both a device for measuring the natural frequency of a thin belt 101, such as a flat belt, having a thickness of equal to or less than 5 mm and a device for measuring the natural frequency of a belt 101 having a thickness of greater than 5 mm and less than 10 mm.

If such a thin belt 101 is wound around the pulleys 102 and 103 so as to have a short span length there, the natural vibration of the belt 101 may reach as high a frequency as roughly 400-500 Hz. In that case, a sonic natural-frequency measurement device tends to be affected by background noise, and therefore, it is difficult for the device to accurately measure the natural frequency of the belt. However, the natural-frequency measurement device S according to the first embodiment can measure the natural frequency of the belt 101 with high accuracy without being affected by an external environment factor such as background noise, no matter how high the frequency is.

While preferred embodiments of the present invention have been described, the technical scope of the present invention is not limited to the range defined by those embodiments. It will be understood by those skilled in the art that the embodiments described above are mere illustrative ones, various other modifications can be readily made by combining the components and work processes of these embodiments, and such modifications also fall within the scope of the present invention.

As can be seen from the foregoing description, the present invention is useful as a natural-frequency measurement device for measuring the natural frequency of a belt, and is particularly suitable for a natural-frequency measurement device that needs to measure the natural frequency of a belt accurately over a wide frequency range.

What is claimed is:

1. A natural-frequency measurement device for measuring, in a belt transmission system including at least two pulleys between which a belt is stretched, the natural frequency of the belt based on a vibration set up by exciting a portion of the belt between two adjacent ones of the at least two pulleys, the device comprising:

an acceleration sensor attached to the portion of the belt between the two adjacent pulleys to sense acceleration resulting from the vibration of the belt; and a measuring instrument configured to measure the natural frequency of the belt based on the acceleration sensed by the acceleration sensor, wherein after the acceleration sensor has sensed that an acceleration produced by exciting the belt is greater than a gravitational acceleration of 2.0, the measuring instrument obtains a power spectrum of a vibration frequency based on the acceleration sensed by the acceleration sensor and determines the natural frequency of the belt based on a peak in the power spectrum limited to a frequency range of higher than or equal to 10 Hz.

2. The natural-frequency measurement device of claim 1, wherein the measuring instrument measures the natural frequency of the belt based on the acceleration sensed by the acceleration sensor for a period of time of 80 to 1400 milliseconds since the accelerator sensor has sensed that the acceleration produced by exciting the belt is greater than a gravitational acceleration of 2.0.

3. The natural-frequency measurement device of claim 1, wherein the acceleration sensor and the measuring instrument are connected together via a communication cable, and the communication cable includes scales along its length.

4. The natural-frequency measurement device of claim 1, wherein a surface of the acceleration sensor to be attached to the belt is a repeatedly attachable adhesive surface.

* * * * *